(12) United States Patent
Sjögren (10) Patent No.: US 8,161,850 B2
(45) Date of Patent: Apr. 24, 2012

(54) INDEXABLE CUTTING INSERTS AND METHODS FOR PRODUCING THE SAME

(75) Inventor: Clas E. Sjögren, Sugarland, TX (US)

(73) Assignee: Sandvik Intellectual Property AB, Sandviken (SE)

( * ) Notice: Subject to any disclaimer, the term of this patent is extended or adjusted under 35 U.S.C. 154(b) by 946 days.

(21) Appl. No.: 12/073,688

(22) Filed: Mar. 7, 2008

(65) Prior Publication Data

US 2008/0213052 A1 Sep. 4, 2008

Related U.S. Application Data

(62) Division of application No. 10/918,391, filed on Aug. 16, 2004, now Pat. No. 7,360,972.

(30) Foreign Application Priority Data

Jan. 13, 2004 (SE) .................. PCT/SE2004/000028

(51) Int. Cl.
*B23B 27/16* (2006.01)
*B23B 27/14* (2006.01)

(52) U.S. Cl. .......... 82/1.11; 407/113; 407/118; 407/119

(58) Field of Classification Search .................. 407/118, 407/119, 113, 114, 115, 116; 82/1.11; 76/115; 428/67
See application file for complete search history.

(56) References Cited

U.S. PATENT DOCUMENTS

| | | | |
|---|---|---|---|
| 653,165 A | 7/1900 | Bedford et al. | |
| 885,770 A | 4/1908 | Lucas | |
| 2,944,323 A | 7/1960 | Stadler | |
| 3,369,283 A | 2/1968 | Colding | |
| 3,990,329 A | 11/1976 | Laurin | |
| 4,200,159 A | 4/1980 | Peschel et al. | |

(Continued)

FOREIGN PATENT DOCUMENTS

DE 41 00 351 A1 7/1991
(Continued)

OTHER PUBLICATIONS

Class E. Sjogren et al., U.S. Appl. No. 11/002,664 entitled "Indexable Cutting Inserts and Methods for Producing the Same" filed Dec. 3, 2004.

(Continued)

*Primary Examiner* — Will Fridie, Jr.
(74) *Attorney, Agent, or Firm* — Morgan, Lewis & Bockius LLP (57) ABSTRACT

A method of making a cutting insert includes: (i) forming a blank having a substrate and superhard material, the substrate having more than 4 pockets, the superhard material disposed within the pockets; (ii) removing cutting tips from the blank by cutting the blank along cutting lines; (iii) providing a cutting insert body having a plurality of cavities for receiving a corresponding number of cutting tips; (iv) inserting a cutting tip into each of the plurality of cavities; and (v) brazing the cutting tips to the cutting insert body. A related cutting insert includes: a cutting insert body having a plurality of cavities formed therein; a plurality of cutting tips, each of the plurality of cutting tips disposed in a respective cavity, the cutting tips having a geometry that provides a mechanical retention or lock when inserted into the cavities of the cutting insert body, the cutting tips further being brazed in the cutting insert body.

40 Claims, 8 Drawing Sheets

U.S. PATENT DOCUMENTS

| | | | |
|---|---|---|---|
| 4,457,765 A | 7/1984 | Wilson | |
| 4,558,974 A | 12/1985 | Pano | |
| 4,561,810 A | 12/1985 | Ohno | |
| 4,714,385 A | 12/1987 | Komanduri | |
| 4,866,885 A | 9/1989 | Dodsworth | |
| 4,909,677 A | 3/1990 | Noguchi et al. | |
| 4,991,467 A | 2/1991 | Packer | |
| 5,075,181 A | 12/1991 | Quinto et al. | |
| 5,115,697 A | 5/1992 | Rodriguez et al. | |
| 5,139,372 A | 8/1992 | Tanabe et al. | |
| 5,147,158 A | 9/1992 | Riviere | |
| 5,154,550 A | 10/1992 | Isobe et al. | |
| 5,183,362 A | 2/1993 | Kuroyama et al. | |
| 5,193,948 A | 3/1993 | Noggle | |
| 5,318,006 A * | 6/1994 | Walen et al. | 125/36 |
| 5,370,717 A | 12/1994 | Lloyd et al. | |
| 5,536,119 A | 7/1996 | Werner et al. | |
| 5,569,000 A | 10/1996 | Littecke et al. | |
| 5,594,931 A | 1/1997 | Krall et al. | |
| 5,598,621 A | 2/1997 | Littecke et al. | |
| 5,676,496 A | 10/1997 | Littecke et al. | |
| 5,829,924 A | 11/1998 | Oshnock et al. | |
| 5,846,032 A | 12/1998 | Murakami | |
| 5,984,593 A | 11/1999 | Bryant | |
| 6,099,209 A | 8/2000 | Murray et al. | |
| 6,106,585 A | 8/2000 | Packer et al. | |
| 6,120,570 A | 9/2000 | Packer et al. | |
| 6,155,755 A * | 12/2000 | Kanada et al. | 407/118 |
| 6,161,990 A | 12/2000 | Oles et al. | |
| 6,286,406 B1 | 9/2001 | Viswanadham et al. | |
| 6,344,149 B1 * | 2/2002 | Oles | 216/11 |
| 6,503,027 B2 | 1/2003 | Men | |
| 6,511,265 B1 | 1/2003 | Mirchandani et al. | |
| 6,543,970 B1 | 4/2003 | Qvarth et al. | |
| 6,579,045 B1 | 6/2003 | Fries et al. | |
| 6,883,412 B1 * | 4/2005 | Turfitt | 83/835 |
| 7,059,811 B2 | 6/2006 | Okamura et al. | |
| 7,322,776 B2 * | 1/2008 | Webb et al. | 407/113 |
| 7,381,016 B2 * | 6/2008 | Oles et al. | 407/118 |
| 7,407,348 B2 * | 8/2008 | Sjogren et al. | 407/119 |
| 7,824,134 B2 * | 11/2010 | Webb et al. | 407/113 |
| 2001/0003569 A1 | 6/2001 | Ota et al. | |
| 2001/0036388 A1 | 11/2001 | Kodama et al. | |
| 2002/0112408 A1 | 8/2002 | Rolander et al. | |
| 2002/0112590 A1 | 8/2002 | Bohner et al. | |
| 2002/0190105 A1 | 12/2002 | Kanada et al. | |
| 2004/0228694 A1 | 11/2004 | Webb et al. | |
| 2004/0237723 A1 * | 12/2004 | Kanada et al. | 76/115 |
| 2005/0183893 A1 | 8/2005 | Sjogren et al. | |
| 2005/0271483 A1 | 12/2005 | Sjogren | |

FOREIGN PATENT DOCUMENTS

| | | |
|---|---|---|
| DE | 195 06 944 | 8/1995 |
| DE | 102 58 133 A1 | 6/2004 |
| EP | 0 291 933 B2 | 6/1994 |
| EP | 1 081 119 A1 | 3/2001 |
| FR | 2 691 657 | 12/1993 |
| FR | 2 706 339 | 12/1994 |
| JP | 59016911 | 1/1984 |
| WO | WO 97/29885 | 8/1997 |
| WO | WO 2004/105983 | 12/2004 |

OTHER PUBLICATIONS

Clas E. Sjogren, U.S. Appl. No. 10/857,922 entitled Indexable Cutting Inserts and Methods for Producing the Same: filed Jun. 2, 2004.

* cited by examiner

INDEXABLE CUTTING INSERTS AND METHODS FOR PRODUCING THE SAME

RELATED APPLICATION DATA

This application is a divisional application of U.S. patent application Ser. No. 10/918,391 filed Aug. 16, 2004, now U.S. Pat. No. 7,360,972 which claims priority of International Application No. PCT/SE04/00028 filed on Jan. 13, 2004, which claims priority of U.S. Provisional Application No. 60/474,956, filed on Jun. 3, 2003, the entire contents of each of these applications are incorporated herein by reference.

FIELD OF THE INVENTION

The present invention relates to cutting inserts having cutting edges formed from a superhard abrasive material, and methods of making the same.

BACKGROUND OF THE INVENTION

In the description of the background of the present invention that follows, reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

Indexable cutting inserts typically have a polygonal shape with a superhard material disclosed at the corners thereof. The superhard material, often a cubic boron nitride or polycrystalline diamond material, aids in the cutting of hard workpiece materials such as metals. These cutting inserts are typically mounted in a fixed position to a cutting tool so as to present one of the corners or areas containing superhard material to the surface of a workpiece. After being used for a period of time, the area of superhard material becomes worn. The cutting insert can then be unfastened from the cutting tool and rotated so as to present a new fresh corner or area of superhard material to the surface of the workpiece.

There are two predominant ways of making such inserts. According to one technique, a stacked structure is formed comprising a first layer of hard backing material and a layer of superhard cutting material superimposed onto the backing layer. Cutting tips are then cut from this stacked structure and brazed to a cutting insert body, typically at a corner thereof. U.S. Pat. No. 5,183,362 to Kuroyama et al., the disclosure of which is incorporated herein by reference, in its entirety, describes such a technique.

However, several problems are associated with such techniques. The braze joint connecting the cutting tips to the body of the cutting insert creates an inherent weak point in the structure. This is particularly true due to the high temperatures that tend to exist during use of such cutting inserts, these high temperatures being in close proximity to the braze joint. Another problem posed by such techniques is that the extent of superhard material presented to the workpiece and available for wear is limited, thus limiting the useful operating period for that particular cutting edge.

A second technique for forming indexable cutting inserts involves providing a blank or substrate having pockets formed therein which are filled with superhard material, then subjecting the blank to a sintering operation which bonds the superhard material to the substrate. The blank is then subsequently machined to give the cutting insert its final shape, i.e.—a generally polygonal body with superhard material disposed at the corners thereof. U.S. Pat. No. 5,676,496, the disclosure of which is incorporated herein by reference, in its entirety, describes such a technique.

Such techniques also present certain difficulties. The process by which the superhard material is bonded to the blank or substrate is difficult and costly. In this regard, the cost of the superhard and substrate raw materials are relatively minor when compared with the costs associated with the process cycle necessary to join them. Thus, from a production efficiency point of view it would seem preferable to form an indexable insert with many corners containing superhard material. That way, the number of costly joining process cycles could be minimized while producing inserts that had many cutting corners. However, customers of such cutting inserts seem to strongly favor cutting inserts having relatively few cutting corners, which are more costly to make on a per unit basis using this technique. Most cutting inserts sold have only 2-4 cutting corners.

Another disadvantage associated with this second technique is that if a single pocket of superhard material is defective, the entire insert cannot be sold and may have to be scrapped. Yet another disadvantage or inefficiency is that only a single cutting insert is produced from each costly and difficult process cycle.

French Patent Publication No. 2,691,657 discloses a cutting insert made with a special autocentering shape made of polycrystalline diamond, CBN or other cutting material. The insert is clamped into the tip by a spring without brazing.

French Patent Publication No. 2,706,339, also an insert of similar materials of a shape (including securing lugs) such that the insert can be secured in the corresponding hole in the tip by a mechanical wedging without brazing.

Thus, a need exists in the art to address the problems discussed above and others.

SUMMARY OF THE INVENTION

The present invention provides devices and methods that address the above-mentioned problems, and others.

The present invention provides improved indexable cutting inserts and improved methods of producing the same.

According to one aspect, the present invention provides a method of making a cutting insert which includes: (i) forming a blank having a substrate and superhard material, the substrate having more than 4 pockets, the superhard material disposed within the pockets; (ii) removing cutting tips from the blank by cutting the blank along cutting lines; (iii) providing a cutting insert body having a plurality of cavities for receiving a corresponding number of cutting tips; (iv) inserting a cutting tip into each of the plurality of cavities; and (v) brazing the cutting tips to the cutting insert body.

According to further aspect, the present invention provides a cutting insert which includes: a cutting insert body having a plurality of cavities formed therein; a plurality of cutting tips, each of the plurality of cutting tips disposed in a respective cavity, the cutting tips having a geometry that provides a mechanical retention or lock when inserted into the cavities of the cutting insert body, and further comprising a braze joint between each of the cutting tips and the cutting insert body.

BRIEF DESCRIPTION OF THE DRAWING FIGURES

The following detailed description can be read in connection with the accompanying drawings in which like numerals designate like elements and in which.

DETAILED DESCRIPTION OF THE INVENTION

Exemplary arrangements and techniques according to the present invention will now be described by reference to the drawing figures.

Figure 1:
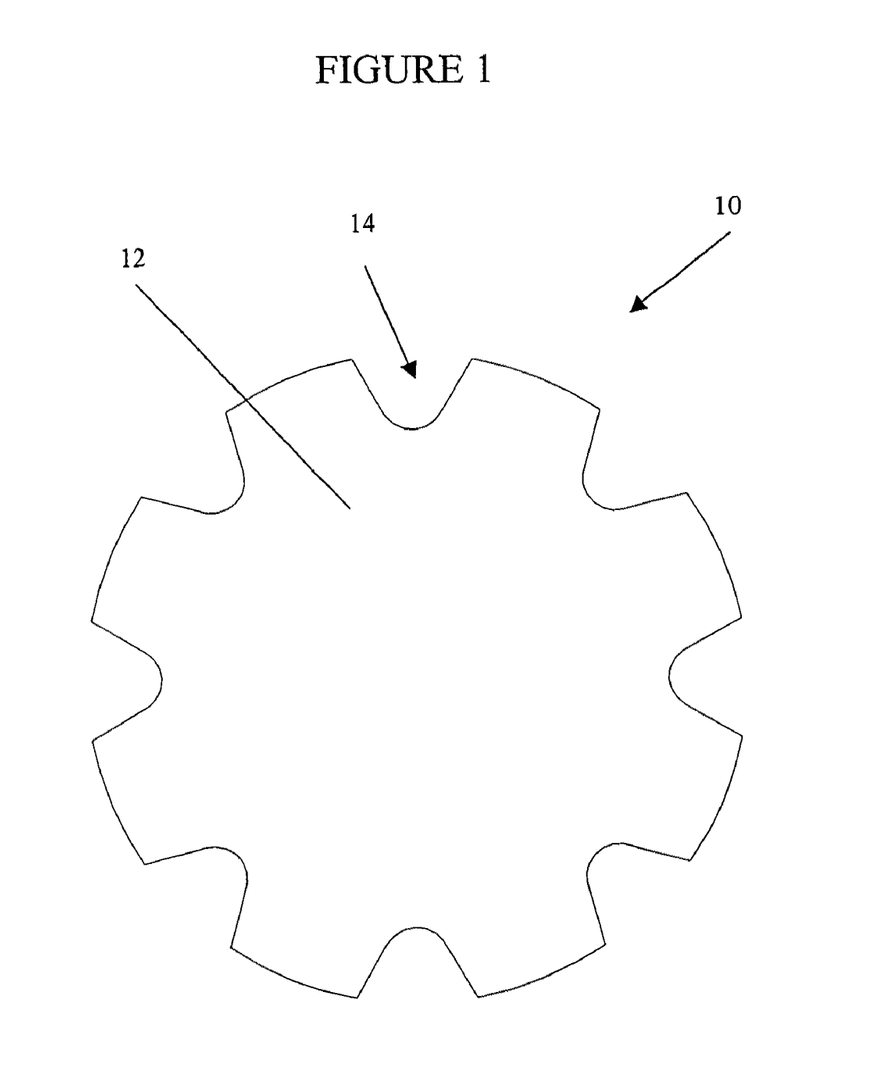
FIG. 1 is a top view of a blank or preform constructed according to the principles of the present invention.

According to the present invention, a blank is formed from a hard material and a superhard cutting material. The blank having a number of pockets for receiving superhard cutting material and a superhard cutting material therein. An illustrative embodiment of such a blank is shown in FIG. 1. As shown in FIG. 1, the blank 10 comprises a substrate 12 of a hard material having a plurality of pockets 14 formed therein. While the blank 10 is illustrated as having a disk-like shape, other geometries are clearly possible, such as a polygon. It is also possible to form a through-hole in the blank 10, which may facilitate handling. Similarly, the pockets 14 may have a size, location, distribution, and number with differ from the illustrated embodiment. For example, the pockets 14 are shown as having a curved or arcuate shape. However, other shapes are clearly contemplated, such as an oval or a polygon.

In the illustrated embodiment, eight pockets 14 are provided in the substrate 12. Other numbers are clearly possible. As previously discussed, it is an advantage of the present invention to form the blank 10 with as many pockets 14 for receiving superhard cutting material as is feasible. Thus, according to one embodiment, the substrate has more than 4 pockets. According to a further embodiment, the substrate has at least 6 pockets. According to another embodiment, the substrate has at least 8 pockets.

While the illustrated embodiment shows an even number of pockets that are symmetrically distributed. It is also within the scope of the present invention to provide an odd number of pockets, such as 7 or 9. It is also contemplated that the pockets can be located in a pattern that is not symmetrical.

The substrate 12 is formed from any suitable hard material. Examples of suitable materials include cemented carbides, cermets, and hard metal alloys. One suitable composition is a WC—Co cemented carbide having 10-20 weight % Co, and preferably having 15-17 weight % Co.

Figure 2:
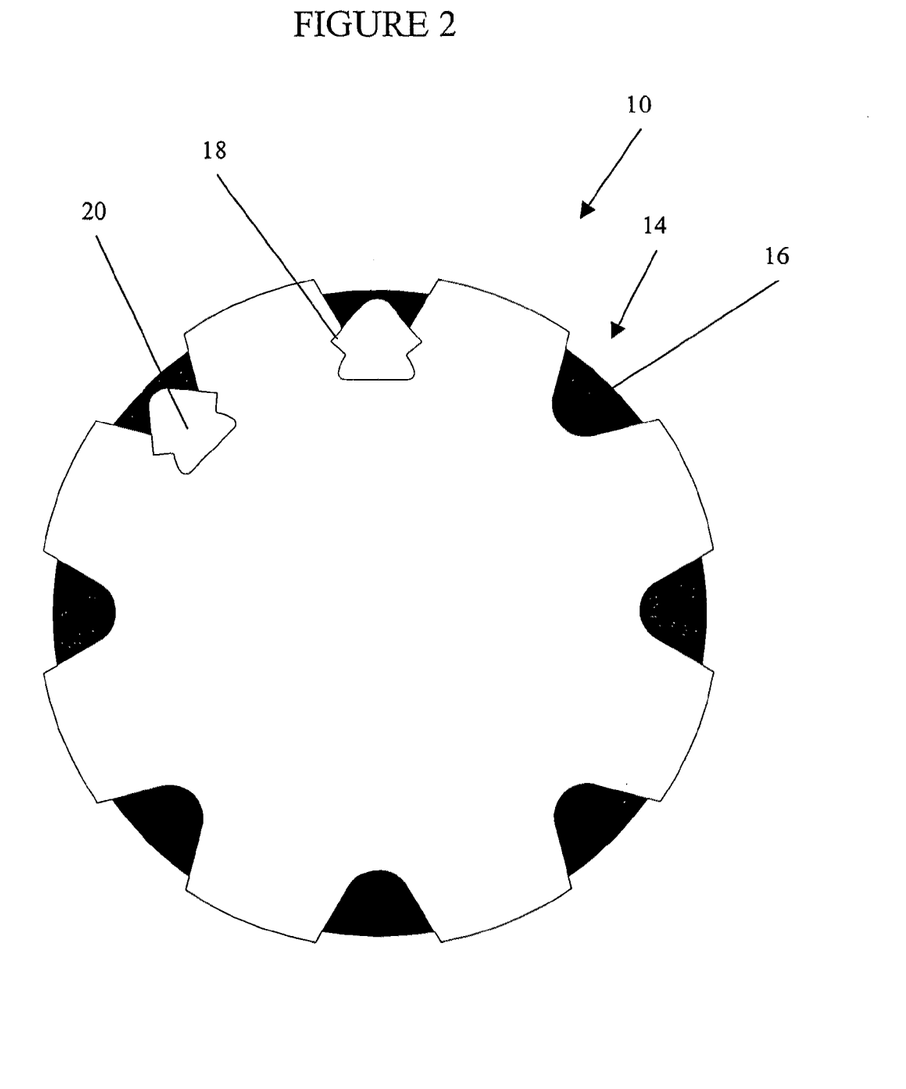
FIG. 2 is a top view of the blank of FIG. 1, but with the pockets thereof filled with a superhard material, and cut lines for removal of a plurality of cutting tips therefrom.

As shown in FIG. 2, a superhard material 16 is provided in one or more, and preferably all, of the pockets 14. The superhard material can comprise any suitable material chosen for its cutting characteristics. The superhard material 16 can initially be provided in the form of a powder. Alternatively, the superhard material 16 can be pre-pressed green bodies.

The superhard material can comprise a boron nitride, such as cubic boron nitride (CBN), or a diamond material such as polycrystalline diamond (PCD). The CBN or PCD material may have additions of other materials, such as carbides, nitrides, carbonitrides, oxides, and/or borides of metals chosen from groups IVa to VIa of the periodic table. The superhard material 16 can be in the form of a composite of CBN or PCD particles forming a first phase, and at least a second phase of a semiconductor (e.g.—Si), metal (e.g.—Cu, Ti, Al), metalloid, or alloys thereof.

After the superhard material 16 is placed within the pockets 14, the blank 10 is then subjected to a suitable treatment to unite the superhard material 16 and the substrate material 12. The treatment can comprise a sintering type treatment performed at elevated temperatures and pressures. When the superhard material is initially in the form of a loose powder, a pressing operation may be performed before or during the sintering treatment, as described, for example, in U.S. Pat. No. 5,676,496. Examples of suitable processes are described, for example, in U.S. Pat. Nos. 4,991,467 and 5,115,697, the disclosures of which are incorporated herein by reference, in their entirety.

The superhard material 16 preferably extends continuously from a top surface of the blank 10 (visible in FIGS. 1-2) to an opposing bottom surface of the blank 10 (not visible in FIGS. 1-2) and is attached to an edge surface of the substrate 12 defined by the pockets 14.

After above-mentioned step of uniting the superhard material 16 to the substrate 12, material is then cut or otherwise removed from the blank. For example, the blank 10 can be cut along lines 18, which define therein the contour of a cutting tip 20.

The cutting tips 20 can be removed by any suitable cutting or material removal/separation procedure. Once such procedure is wire cutting, such as EDM wire cutting.

The cutting tips can be provided with any suitable geometry. According to one advantageous aspect of the present invention, the cutting tips 20 are provided with a geometry that will provide a mechanical retention or lock when placed within the body of an indexable cutting insert. A mechanical retention or lock provides a certain amount of stability for the insert within the tip. However, a much greater stability is provided when the insert is also brazed into the body as will be described in more detail. According to the illustrated embodiment, a cutting tip 20 which is removed from the blank 10 has a geometry or shape that can generally be characterized as a dovetail shape or geometry.

Figure 3:
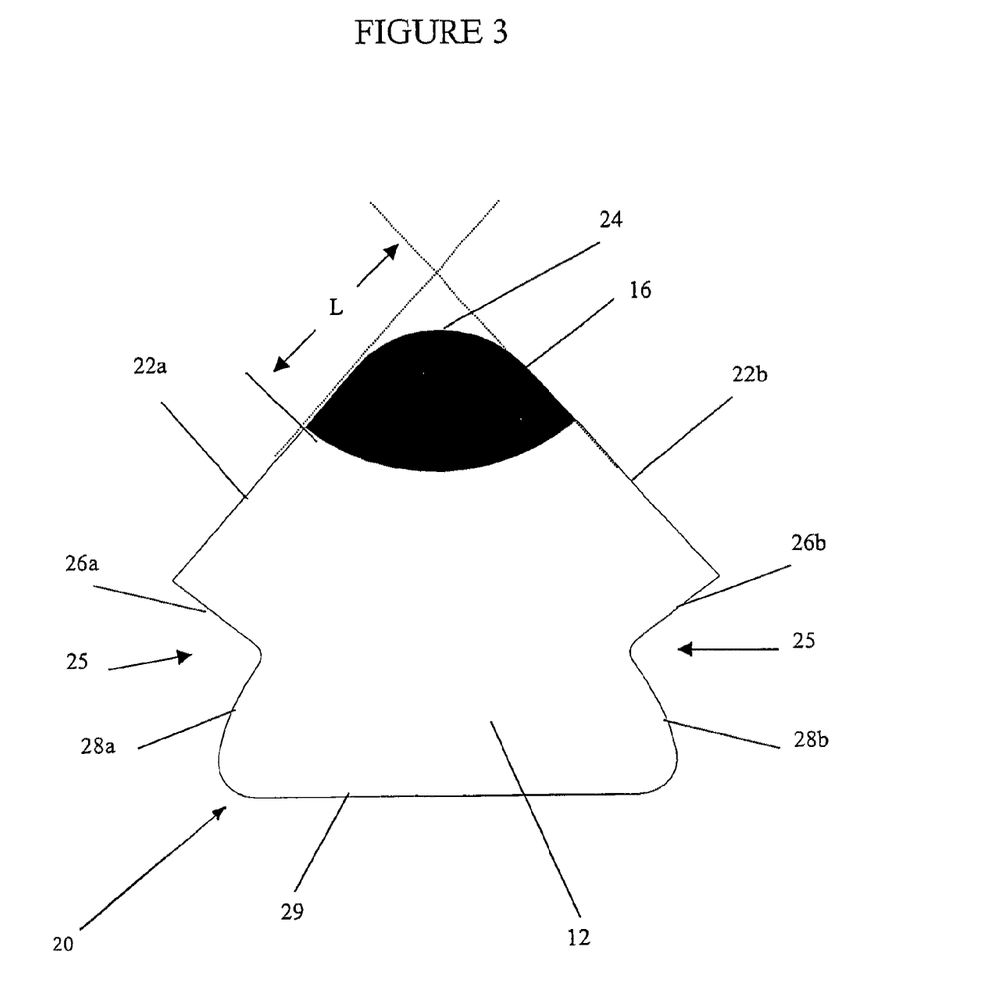
FIG. 3 is a top view showing details of the geometry of a cutting tip formed according to the principles of the present invention.

A specific illustrative example of this type of cutting tip geometry comprehended by the present invention is illustrated in FIG. 3. The geometry or shape of the cutting tip 20 illustrated in FIG. 3 can be described as follows. A pair of converging forward surfaces 22a and 22b meet at a forward nose 24, which is preferably rounded. The nose 24 is presented to the workpiece during use of the cutting tip. As illustrated in FIG. 3, a portion of the surfaces 22a and 22b, and the nose 24 comprise superhard cutting material 16. The extent of superhard cutting material 16 extending from the apex of the nose 24 and back along surfaces 22a and 22b corresponds to dimension "L", and can be termed the leg length. According to one embodiment of the present invention, the dimension L is at least 2 mm. According to another embodiment, the dimension L can be at least 3 mm.

Moving in the direction away from the forward nose 24, subsequent to the converging surfaces 22a and 22b is an area of reduced width or a waisted section 25. The waisted section is defined by a first pair of angled surfaces 26a and 26b, as well as a second set of surfaces 28a and 28b. Surfaces 26a and 28a, as well as 26b and 28b meet at the area of reduced width and define a trough-like formation. The cutting tip may also comprise a planar rear surface 29.

Numerous modifications to the above-described geometry are contemplated, so long as the insert geometry provides a self-locating, self-retention property when placed in a cutting insert body.

Figure 4:
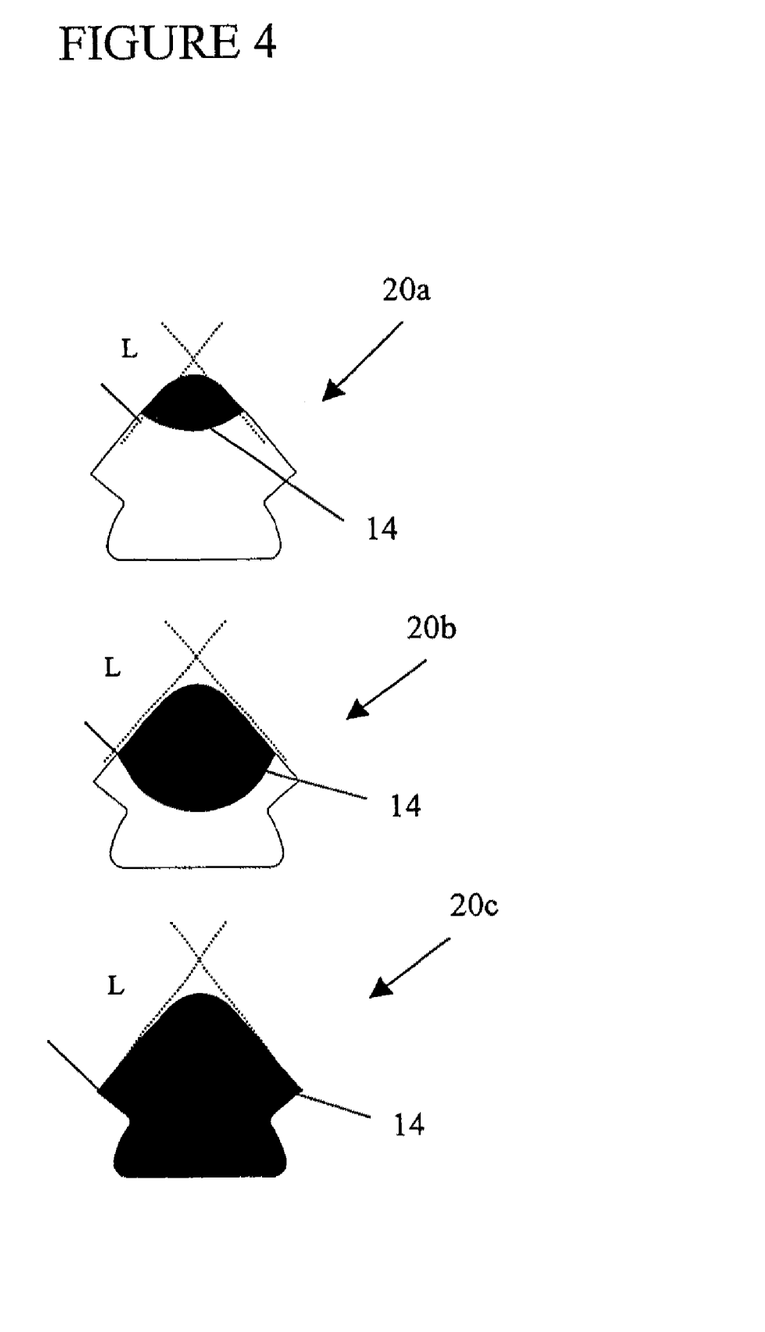
FIG. 4 is a top view of various cutting tips formed according to the principles of the present invention.

FIG. 4 is illustrative of three alternative cutting tip configurations: 20a, 20b and 20c. These cutting tip configurations differ with respect to the amount of superhard material contained therein, and consequently the leg length (L) thereof. The amount of superhard material contained in the cutting tip 20 can be varied by choosing the location of the cutting lines 18 (FIG. 2), as well as by the size, configuration and/or depth of the pockets 14 in the blank 10. As illustrated in FIG. 4, a cutting tip 20c can be configured such that it is formed entirely from superhard cutting material, or a cutting tip 20a can be configured such that the superhard material in a relatively minor component thereof.

Figure 5:
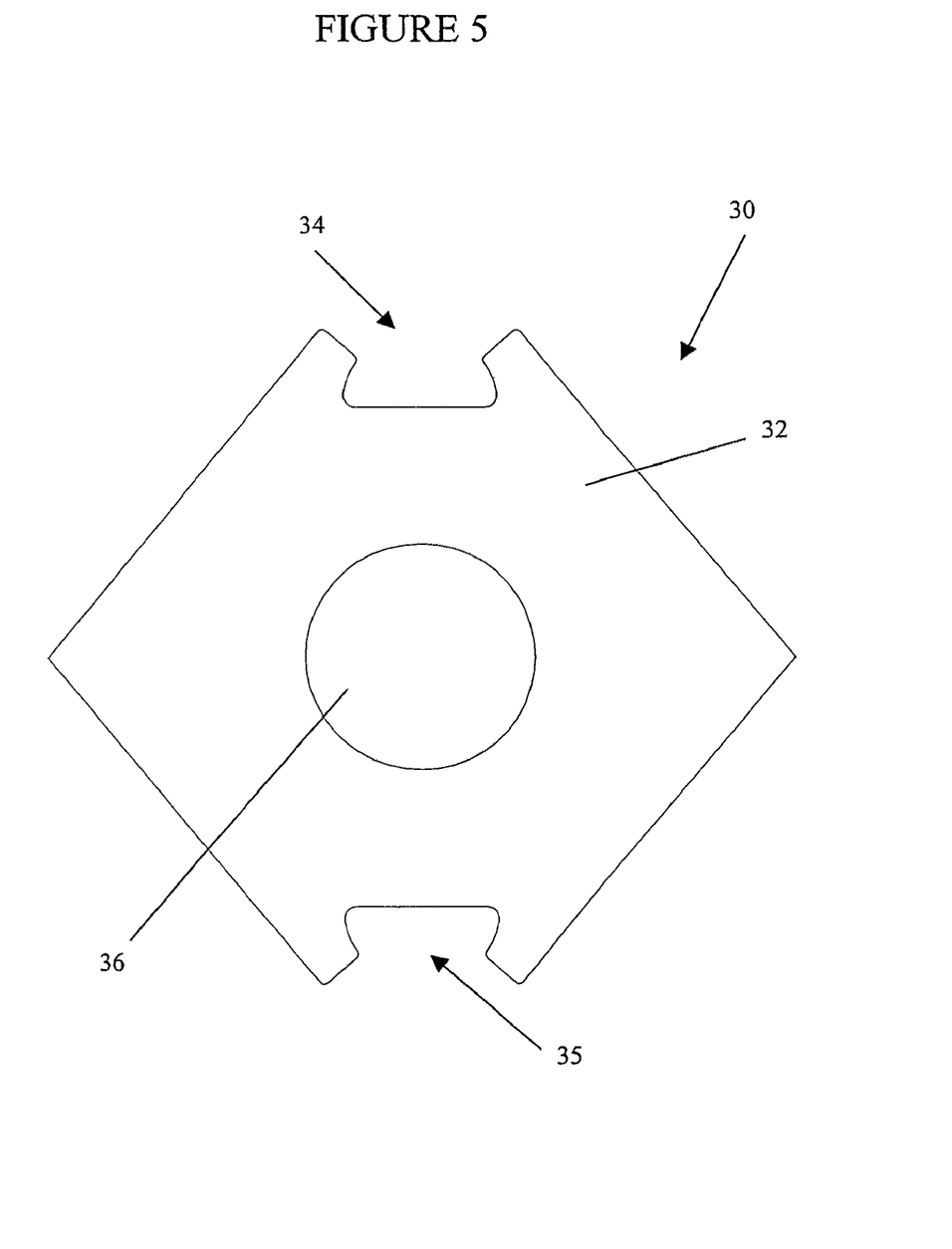
FIG. 5 is a top view of a cutting insert body formed according to the present invention.

The above-described cutting tips of the present invention are affixed to the body of an cutting insert. One illustrative example of an appropriate cutting insert body is shown in FIG. 5. The illustrated cutting insert body 30 comprises a body 32 of hard material provided with a suitable number of cavities 34, 35 for receiving cutting tips 20. The cavities 34, 35 are preferably provided with a shape or geometry that is complimentary to the shape or geometry of the cutting tips disposed therein.

The body 32 is composed of any suitable hard material. Examples of suitable materials include cemented carbides, cermets, and hard metal alloys. One suitable composition is a WC—Co cemented carbide having 10-20 weight % Co, and preferably having 15-17 weight % Co.

Numerous modifications to the illustrated example are contemplated. For example, the illustrated blank 30 is generally in the shape of a polygon or a diamond and is configured to receive two identical cutting tips. However, the shape of the body can be other polygonal shapes, an oval, or circular. The central through hole 36, which can be used for a particular type of mounting, can be omitted. The body 30 can be configured to receive more than two tips. For example, up to four tips can be provided at each corner. It is not necessary that the tips disposed in the body 30 be identical to one another. The cutting tips and/or the body 30 may be machined, prior to, and/or, subsequent to installation of the cutting tips. The cutting insert body 30 and/or the cutting tip(s) 20 may be provided with one or more coating(s). Further, the body 30 may be provided with a "chip-breaker" configuration, such as described in U.S. Pat. No. 5,569,000, the disclosure of which in incorporated herein by reference, in its entirety.

Figure 6:
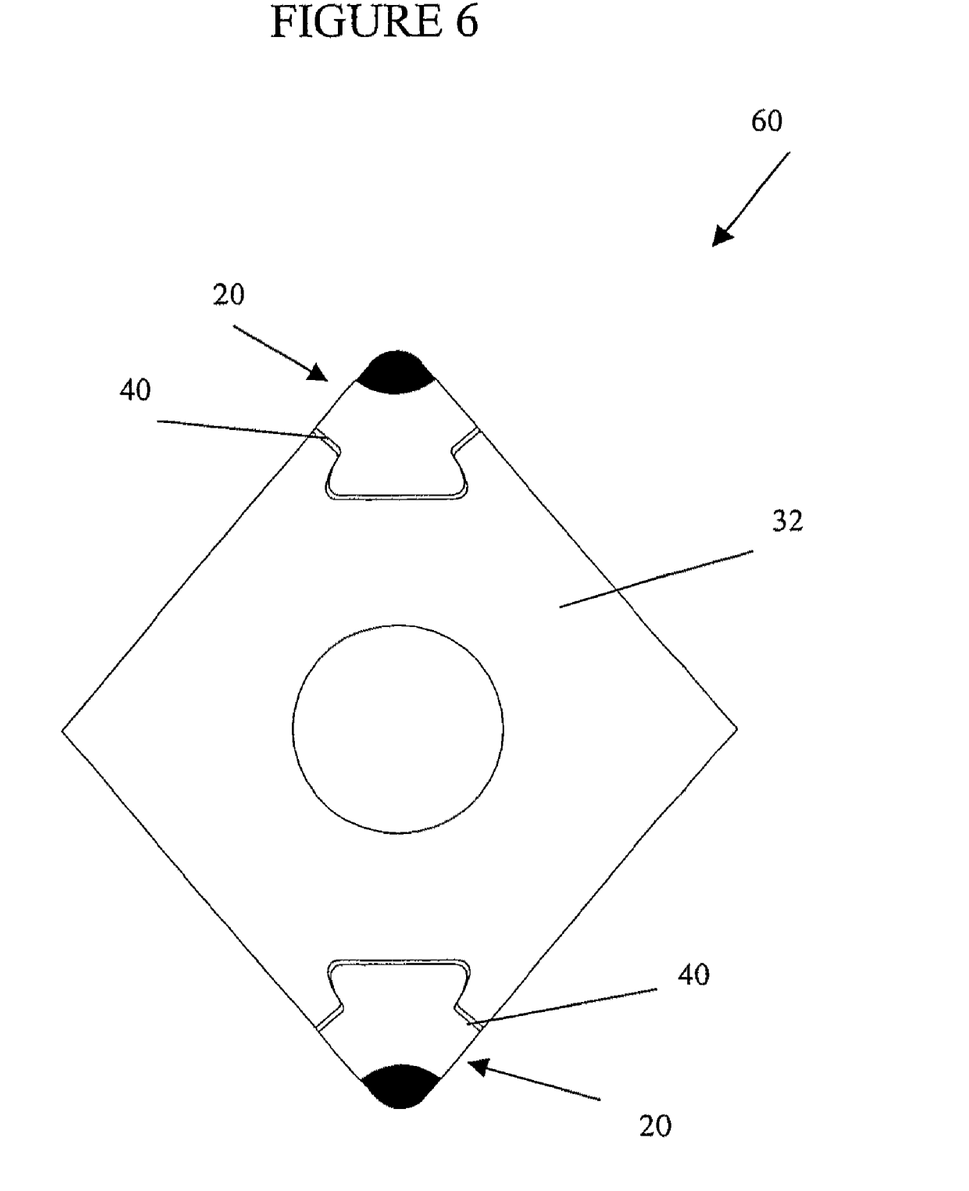
FIG. 6 is a top view of an indexable cutting insert formed according to the present invention.

FIG. 6 is an illustrative indexable cutting insert 60 comprising a cutting insert body 32 having cutting tips 20 retained thereby. The cutting tips 20 can be affixed to the body 32 by any suitable technique. Suitable techniques include soldering or brazing. One such technique is described in U.S. Pat. No. 5,183,362, the disclosure of which is incorporated herein, by reference, in its entirety. In the illustrated embodiment, the cutting tips are affixed to the body 32 by a braze joint 40.

Figure 7:
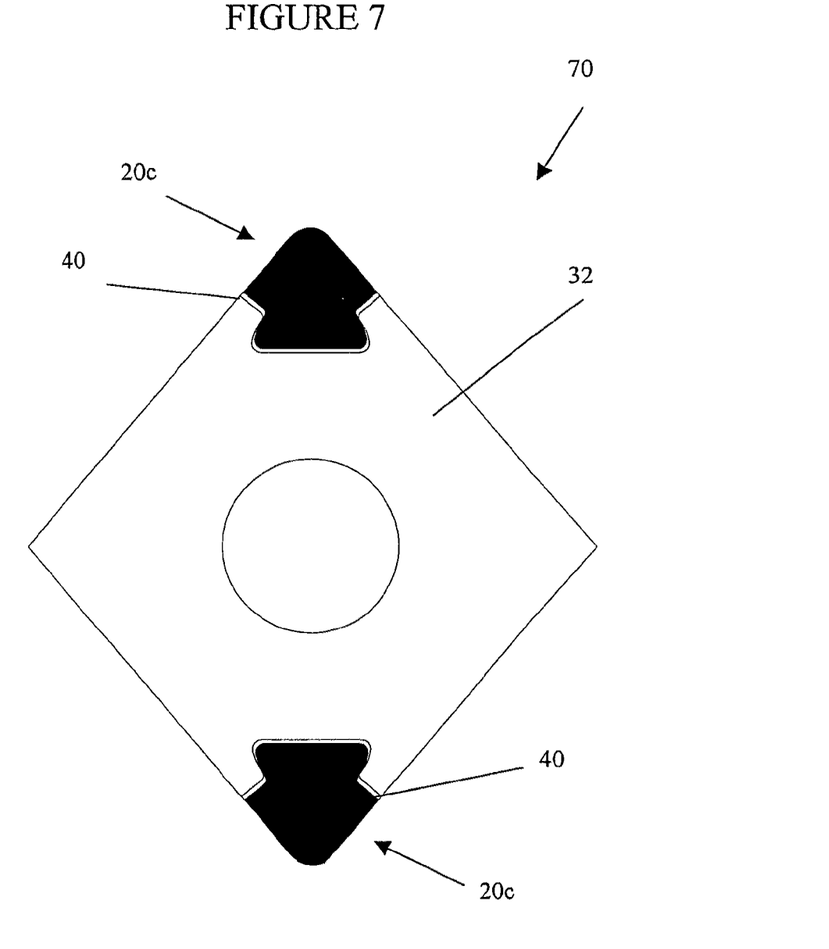
FIG. 7 is a top view of an alternative indexable cutting insert formed according to the present invention.

FIG. 7 is another illustrative embodiment of an indexable cutting insert 70 formed according to the principles of the present invention. The cutting insert 70 has cutting tips 20c configured as described in connection with FIG. 4.

Figure 8:
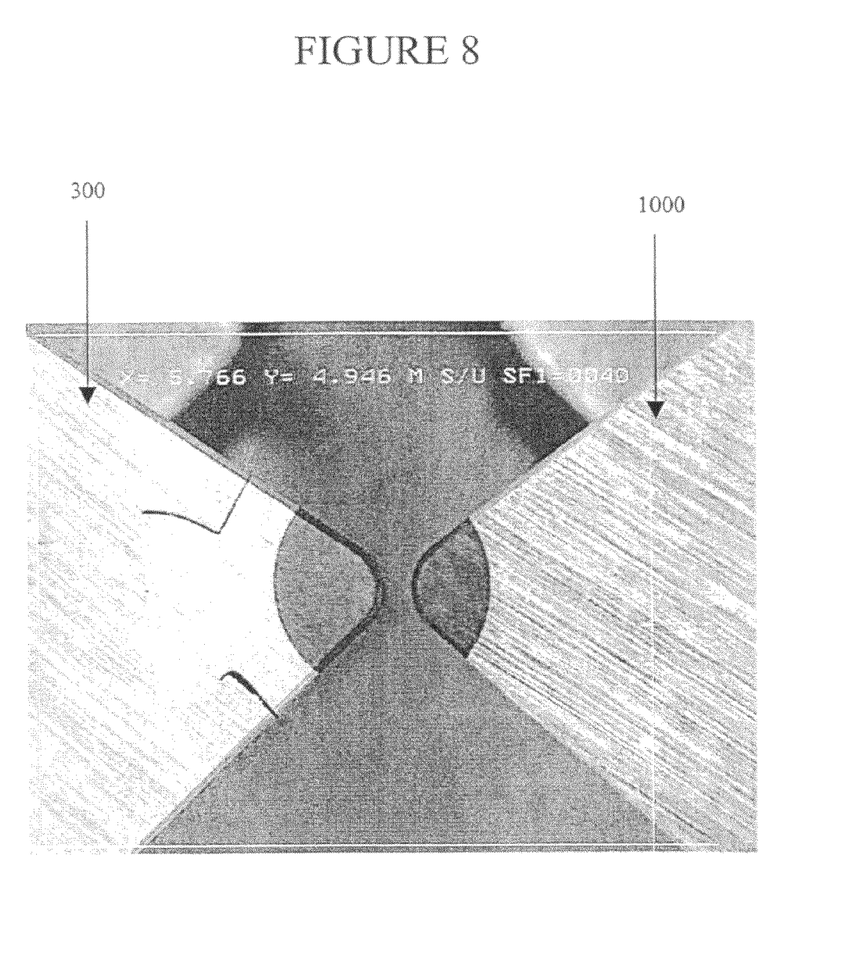
FIG. 8 is an image comparing a cutting insert formed according to the present invention with a conventional cutting insert.

FIG. 8 is an image comparing a cutting insert 300 formed according to the present invention, with a conventionally formed cutting insert 1000. As illustrated in FIG. 8, the leg length of the superhard material of the cutting insert 300 of the present invention is significantly greater than the leg length of the superhard material of the conventional cutting insert thereby providing the possibility of increased useful service life of the cutting tip.

The present invention and the above-described embodiments thereof provide numerous advantages over conventional cutting inserts and their methods of fabrication.

By forming a blank having a relatively large number of pockets of superhard material, a relatively large number of cutting tips can be produced by each costly and difficult pressing/sintering process cycle, thereby providing an advantage in terms of economy. By removing the tips from the blank and affixing them to the body of a cutting insert, the each cutting insert can have a number of tips that is less that the number removed from the blank. Thus, cutting inserts having a relatively few number of cutting tips, for example 2-4 tips, can be manufactured provided to meet the demands of the market, but retain the advantage of being made in an economical manner. The manufacturing costs of producing these indexable cutting inserts according to the method of the present invention can be on the order of 50-60% less than the costs of producing inserts according to the second technique described in the Background of the Invention section herein.

The technique of the present invention also provides the advantage of having an increased yield when compared to techniques such as the second technique described in the Background of the Invention section. When utilizing the technique of the present invention, one defective superhard material pocket may result in one cutting tip being scrapped. By comparison, a single defective superhard material pocket in the second conventional technique described herein can result in the entire cutting insert being scrapped.

According to the present invention, the cutting tips are provided with a geometry that positively locates the tip within the body of the cutting insert upon assembly, thus eliminating the need for complicated fixtures to hold the insert in place during brazing. In addition, the geometry of the cutting tip provides for mechanical retention within the body of the cutting insert in addition to the retention provided by brazing.

A cutting tip formed according to the principles of the present invention also facilitates the formation of a cutting tip wherein the superhard material has a leg length that is greater than that readily attainable by conventional techniques (e.g. 2-3 mm or more). Increased leg length provides more superhard material available for machining the workpiece, thereby adding length to the useful service life of the cutting tip. Moreover, the superhard material of the cutting tip of the present invention extends from the top surface thereof to the bottom surface, thereby providing a first cutting edge surface on the top, and a second cutting edge surface on the bottom of the cutting tip that can be accessed by flipping the cutting insert over.

Additional advantages will be evident to those of ordinary skill in the art.

The described embodiments of the present invention are intended to be illustrative rather than restrictive, and are not intended to represent every possible embodiment of the present invention. Various modifications can be made to the disclosed embodiments without departing form the spirit or scope of the invention as set forth in the following claims, both literally and in equivalents recognized by law.

What is claimed is:

1. A method of making a cutting insert, the method comprising: (i) forming a blank comprising a substrate and superhard material, the substrate having more than 4 pockets, the superhard material disposed within the pockets; (ii) removing cutting tips from the blank by cutting the blank; (iii) providing a cutting insert body having a plurality of cavities for receiving a corresponding number of cutting tips; (iv) inserting a cutting tip into each of the plurality of cavities; and (v) brazing the cutting tips to the cutting insert body.

2. The method of claim 1, wherein the cutting insert is indexable.

3. The method of claim 1, wherein the blank is generally disk-shaped.

4. The method of claim 1, wherein the blank has the shape of a polygon.

5. The method of claim 1, wherein the blank is provided with a throughhole.

6. The method of claim 1, wherein the pockets have an arcuate shape.

7. The method of claim 1, wherein the substrate is provided with at least 6 pockets.

8. The method of claim 1, wherein the substrate is provided with at least 7 pockets.

9. The method of claim 1, wherein the substrate is provided with at least 8 pockets.

10. The method of claim 1, wherein the substrate is provided with at least 9 pockets.

11. The method of claim 1, wherein the substrate is formed from a cemented carbide, cermet, or hard metal alloy.

12. The method of claim 11, wherein the substrate is formed of a cemented carbide comprising WC and Co, the cemented carbide comprising 10-20 weight % Co.

13. The method of claim 1, wherein step (i) further comprises introducing the superhard material in the form of a powder into the pockets.

14. The method of claim 13, wherein step (i) further comprises pressing and sintering the blank thereby unifying the substrate and superhard material.

15. The method of claim 13, wherein step (i) further comprises introducing the superhard material in the form of pre-pressed green bodies into the pockets.

16. The method of claim 15, wherein step (i) further comprises sintering the blank thereby unifying the substrate and superhard material.

17. The method of claim 1, wherein the superhard material comprises cubic boron nitride or polycrystalline diamond.

18. The method of claim 17, wherein the superhard material further comprises at least one of a nitride, carbonitride, oxide or boride of a metal chosen from groups IVa-VIa of the Periodic Table.

19. The method of claim 17, wherein the superhard material comprises a composite having a first phase comprising cubic boron nitride or polycrystalline diamond particles and a second phase comprising a metal, a metalloid, or alloys thereof.

20. The method of claim 1, wherein the blank comprises a top surface and an opposing bottom surface, and the superhard material extends from the top surface to the bottom surface.

21. The method of claim 1, wherein step (ii) comprises wire cutting to remove the cutting tips from the blank.

22. The method of claim 1, wherein step (ii) comprises providing the cutting tips with a geometry that provides a mechanical retention or lock when inserted into the body of the cutting insert.

23. The method of claim 1 wherein the cutting tip is provided with a generally dovetail shape.

24. The method of claim 23, wherein the cutting tip is provided with a rounded forward nose and a pair of converging forward surfaces that meet at the nose.

25. The method of claim 24, wherein at least the rounded forward nose portion of the cutting tip comprises the superhard material.

26. The method of claim 25, wherein the superhard material is provided with a leg length of at least 2 mm, the leg length being defined as a distance between a first point on one of the converging forward surfaces where the superhard material is connected to the substrate material, and a second point defined by the point of intersection between two imaginary lines drawn along each of the converging forward surfaces.

27. The method of claim 26, wherein the leg length is at least 3 mm.

28. The method of claim 24, wherein the cutting tip is provided with a waisted section of reduced width.

29. The method of claim 28, wherein the waisted section comprises a first pair of angled surfaces and a second pair of surfaces that meet at the section of reduced width.

30. The method of claim 1, wherein the cutting insert body is formed from a cemented carbide, cermet, or hard metal alloy.

31. The method of claim 30, wherein the cutting insert body is formed of a cemented carbide comprising WC and Co, the cemented carbide comprising 10-20 weight % Co.

32. The method of claim 1, wherein the cutting insert body is provided in the form of a polygon, oval or circle.

33. The method of claim 1, wherein the cutting insert is provided in the form of a polygon.

34. The method of claim 1, wherein the cavities are provided with a geometry that is complimentary to the geometry of the cutting tips received therein.

35. The method of claim 1, further comprising applying at least one coating to at least a portion of the cutting tip and/or cutting insert body.

36. The method of claim 1, further comprising forming a chip-breaker structure on the cutting insert body.

37. The method of claim 1, comprising forming the cutting insert body in the shape of a polygon, and providing no more than 2 cavities therein.

38. The method of claim 1, comprising forming the cutting insert body in the shape of a polygon, and providing no more than 4 cavities therein.

39. A method of making a cutting insert, the method comprising:
forming a blank comprising a substrate and superhard material, the substrate having more than 4 pockets, the superhard material disposed within the pockets;
removing cutting tips from the blank by cutting the blank;
providing a cutting insert body having a plurality of cavities for receiving a corresponding number of cutting tips;
inserting a cutting tip into each of the plurality of cavities; and
brazing the cutting tips to the cutting insert body,
wherein the cutting tips removed from the blank include both a first portion comprising the superhard material and a second portion comprising the substrate, and
wherein the superhard material comprises a first phase including cubic boron nitride or polycrystalline diamond and a second phase including a semiconductor, metal, metalloid, or alloys thereof.

40. The method of claim 39, wherein the first phase includes a carbide, nitride, carbonitride, oxide, and/or boride of a metal chosen from groups IVa to VIa of the periodic table.

* * * * *